No. 732,434. PATENTED JUNE 30, 1903.
G. T. NICHOLLS.
WARP AND WEFT KNITTING MACHINE.
APPLICATION FILED NOV. 18, 1902.
NO MODEL. 8 SHEETS—SHEET 1.

FIG. 1.

WITNESSES.
Charles T. Hannigan.
Joseph R. Bullock Jr.

INVENTOR.
George T. Nicholls
By Warren R. Pine
Attorney.

No. 732,434. PATENTED JUNE 30, 1903.
G. T. NICHOLLS.
WARP AND WEFT KNITTING MACHINE.
APPLICATION FILED NOV. 18, 1902.
NO MODEL. 8 SHEETS—SHEET 2.
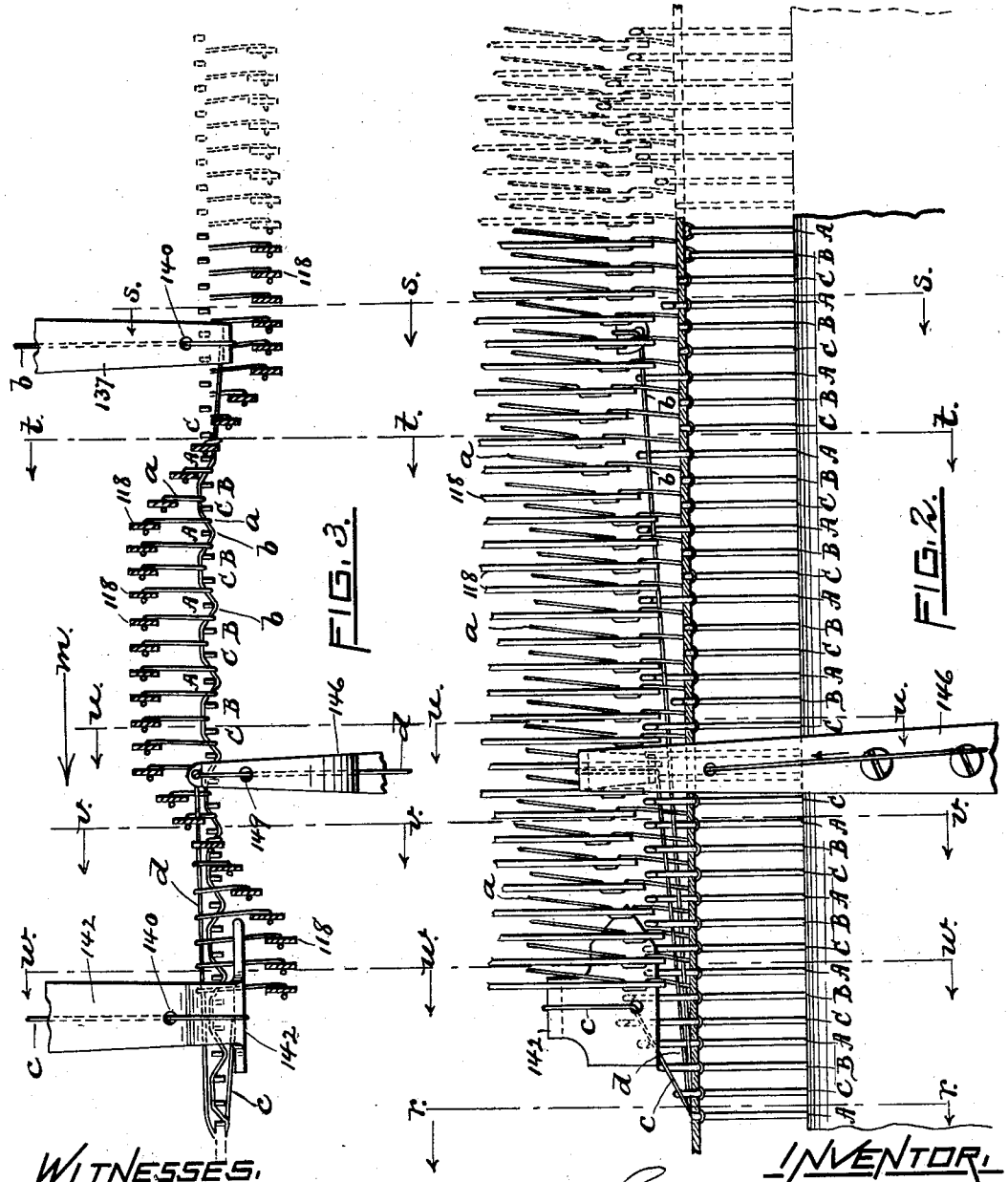

No. 732,434. PATENTED JUNE 30, 1903.
G. T. NICHOLLS.
WARP AND WEFT KNITTING MACHINE.
APPLICATION FILED NOV. 18, 1902.
NO MODEL. 8 SHEETS—SHEET 3.
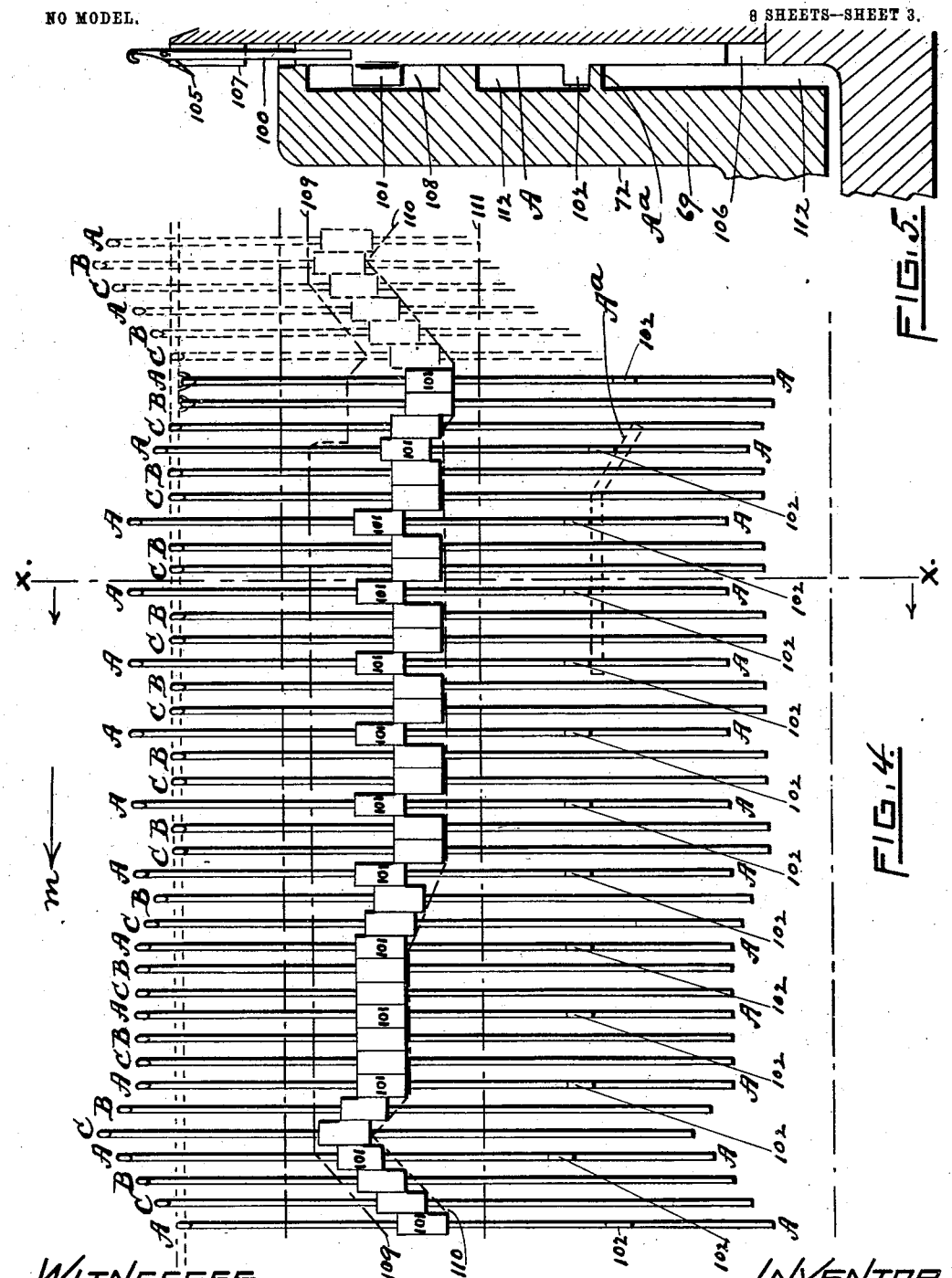
WITNESSES. INVENTOR.
Charles T. Hannigan. George T. Nicholls
Joseph R Bullock Jr By Warren R. Pence
 Attorney.

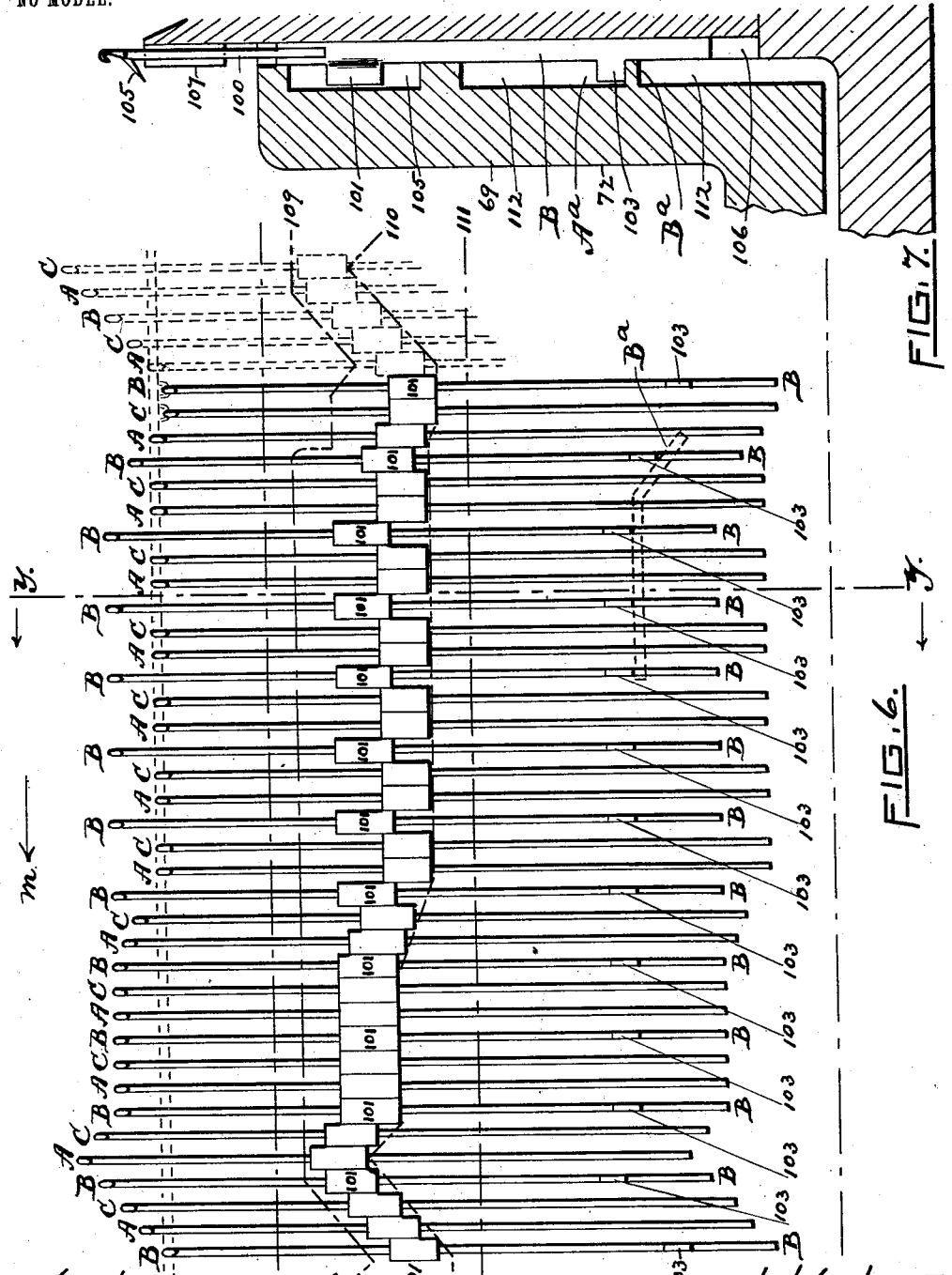

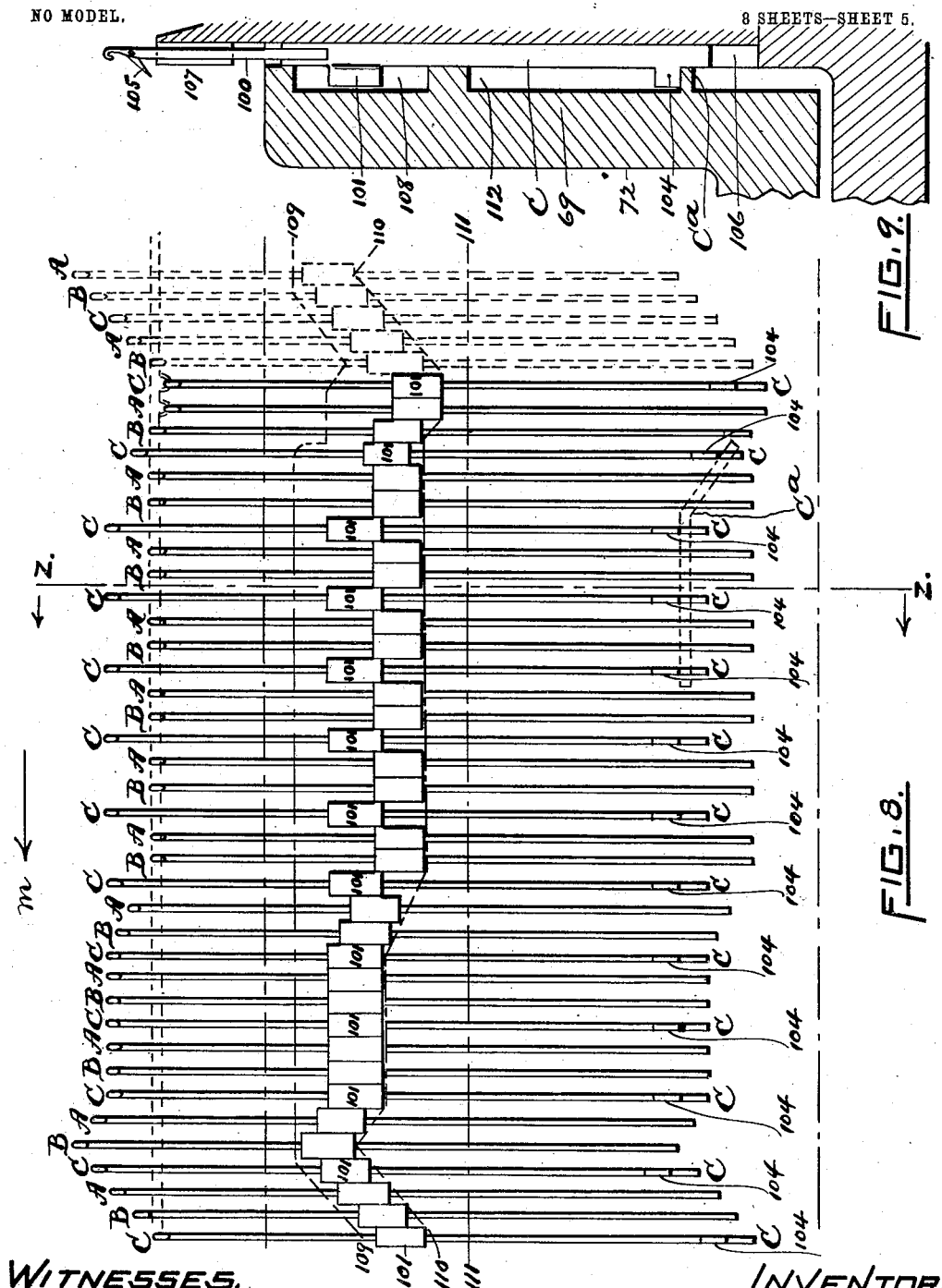

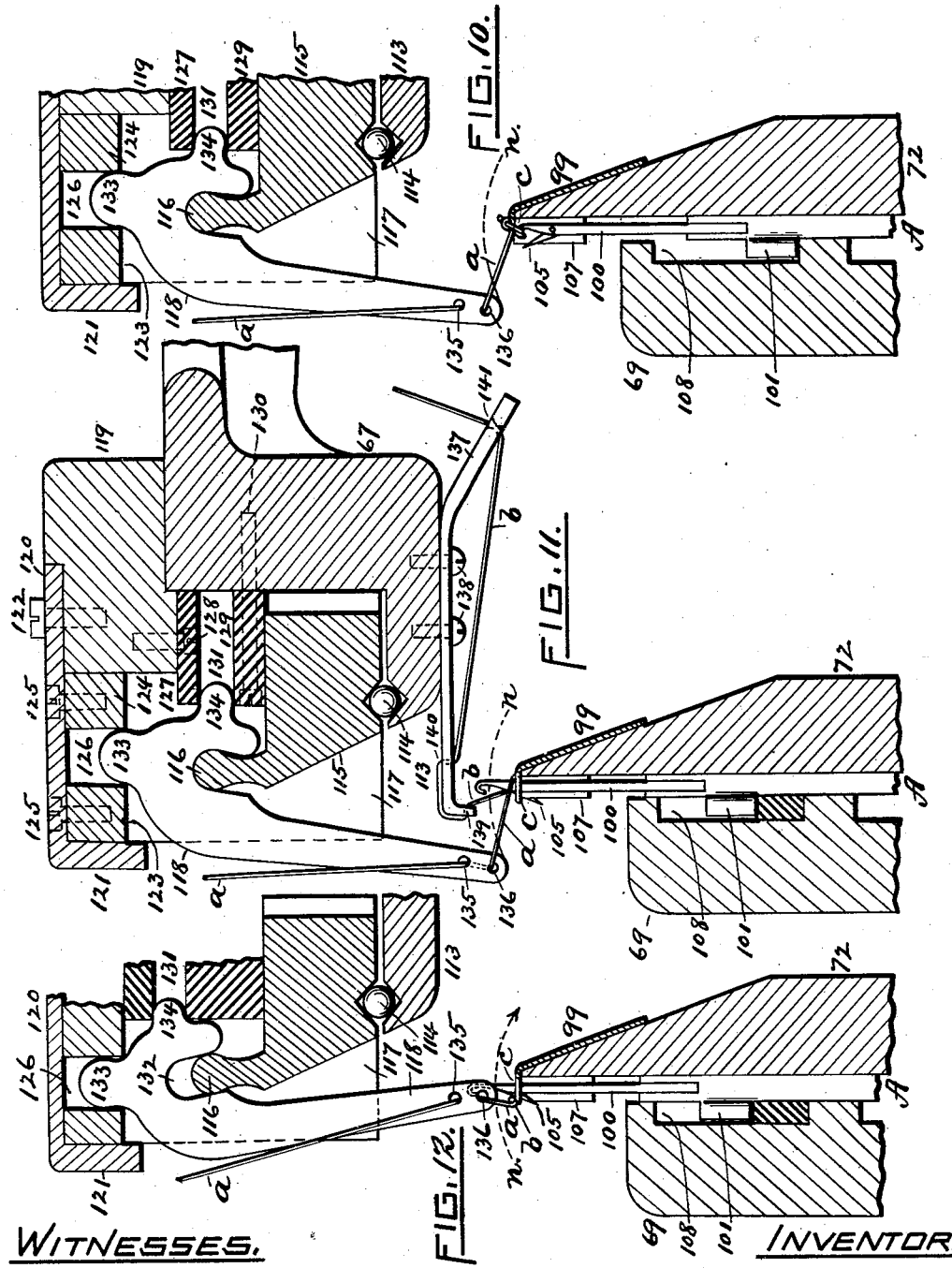

No. 732,434. PATENTED JUNE 30, 1903.
G. T. NICHOLLS.
WARP AND WEFT KNITTING MACHINE.
APPLICATION FILED NOV. 18, 1902.
NO MODEL. 8 SHEETS—SHEET 7.
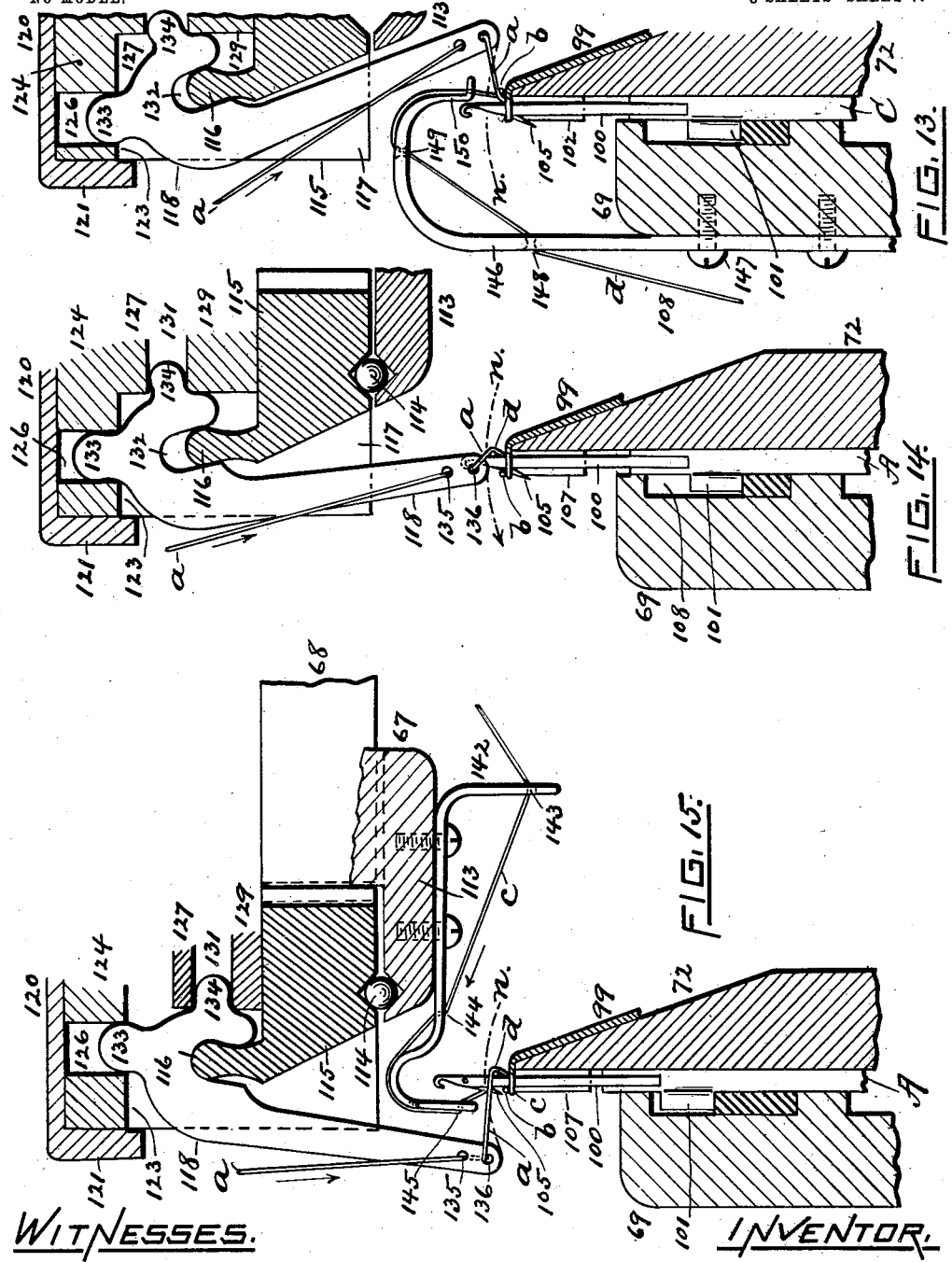

No. 732,434. PATENTED JUNE 30, 1903.
G. T. NICHOLLS.
WARP AND WEFT KNITTING MACHINE.
APPLICATION FILED NOV. 18, 1902.
NO MODEL. 8 SHEETS—SHEET 8.
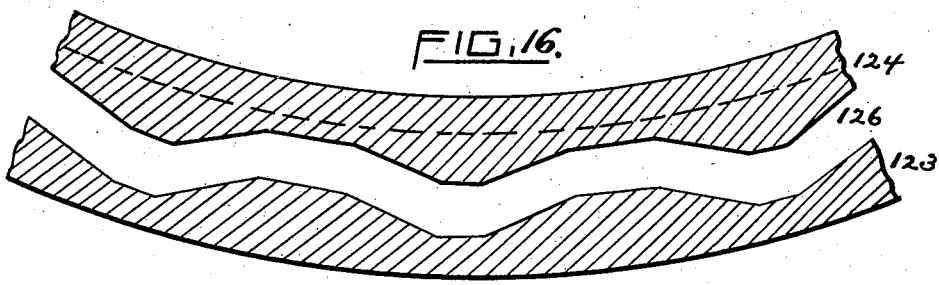
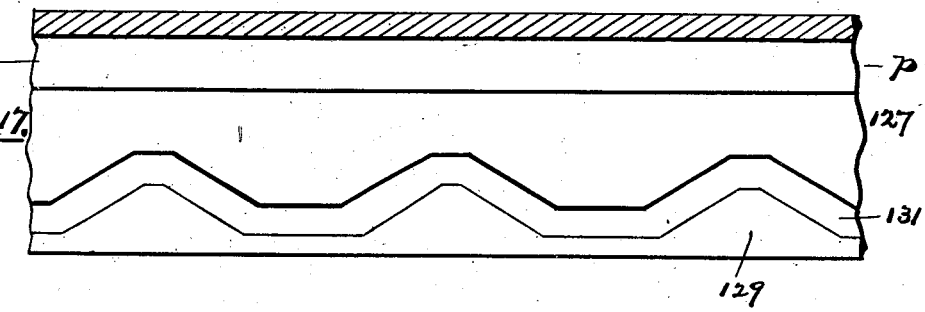
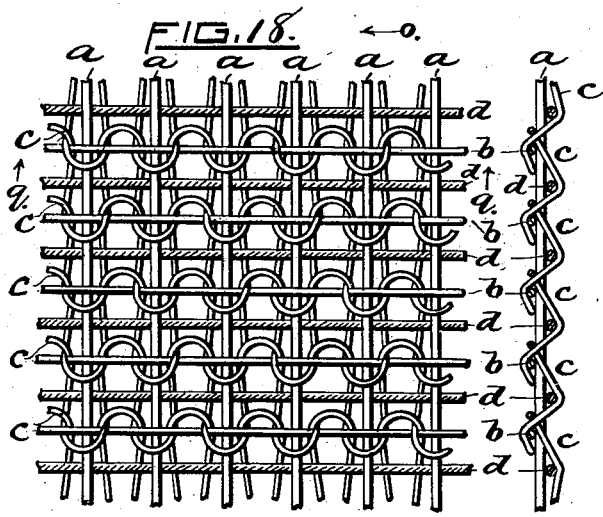
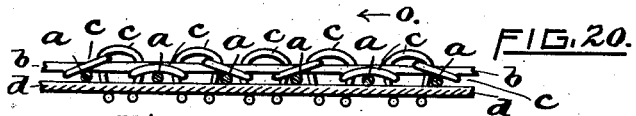
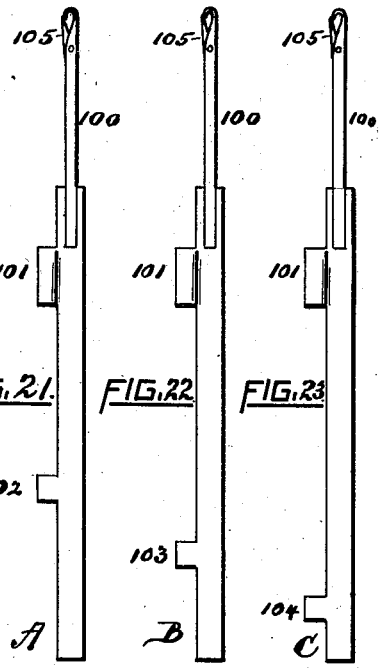
WITNESSES.
Charles T. Hannigan
Joseph R. Bullock Jr.
INVENTOR.
George T. Nicholls
By Warren R. Pine
Attorney.

No. 732,434. Patented June 30, 1903.

UNITED STATES PATENT OFFICE.

GEORGE T. NICHOLLS, OF PROVIDENCE, RHODE ISLAND, ASSIGNOR, BY MESNE ASSIGNMENTS, TO MORTONFIELD MANUFACTURING COMPANY, OF CHERAW, SOUTH CAROLINA, A CORPORATION OF SOUTH CAROLINA.

WARP AND WEFT KNITTING MACHINE.

SPECIFICATION forming part of Letters Patent No. 732,434, dated June 30, 1903.

Application filed November 18, 1902. Serial No. 131,801. (No model.)

*To all whom it may concern:*

Be it known that I, GEORGE T. NICHOLLS, a citizen of the United States, residing at Providence, in the county of Providence and State of Rhode Island, have invented certain new and useful Improvements in Warp and Weft Knitting Machines, of which the following is a specification, reference being had therein to the accompanying drawings.

Like characters of reference indicate like parts.

Figure 1 is a front elevation of my improved warp and weft knitting machine with the annular parts shown in diametrical vertical section. Fig. 2 is a front diagrammatical elevation of a section or series of the knitting-needles, warp-distributers, weft-guide, and one of the filling-thread guides, together with the warp, weft, filling, and knitting threads in elevation and the fabric in section. Fig. 3 is a diagrammatical top plan of the parts shown in Fig. 2. Fig. 4 is a diagrammatical view in elevation of the knitting-needles in position in the needle-camway, one of the pattern-cams, and those needles which are raised by said pattern-cam. Fig. 5 is a view partly in side elevation and partly in section as seen on line $x$ $x$ of Fig. 4. Fig. 6 is a diagrammatical view in elevation of the knitting-needles in position in the needle-camway, another of the pattern-cams, and those needles which are raised by said pattern-cam. Fig. 7 is a view partly in side elevation and partly in section as seen on line $y$ $y$ of Fig. 6. Fig. 8 is a diagrammatical view in elevation of the knitting-needles in position in the needle-camway, still another pattern-cam, and those needles which are raised by said pattern-cam. Fig. 9 is a view partly in side elevation and partly in section as seen on line $z$ $z$ of Fig. 8. Fig. 10 is a view of a warp-distributer, needle, and needle-bar, which, together with the threads, are shown in side elevation, and of the warp-distributer ring and cams, the needle-cylinder, and needle cam-cylinder, which are shown in section as seen on line $r$ $r$ of Figs. 2 and 3. In this figure the said parts are shown in their relative position when the stitch has been formed and is slipping from the needle into the fabric. Fig. 11 is a view of a warp-distributer, needle, needle-bar, and weft-guide, which, together with the threads, are shown in side elevation, and of the warp-distributer ring and cams, the needle-cylinder, and needle cam-cylinder, which are shown as seen in section on line $s$ $s$ of Figs. 2 and 3. In this figure the said parts are shown in their relative position just at the time when the weft-thread is being laid in. Fig. 12 is a view of a warp-distributer, needle, and needle-bar, which, together with the threads, are shown in side elevation, and of the warp-distributer ring and cams, the needle-cylinder, and needle cam-cylinder, which are shown as seen in section on line $t$ $t$ of Figs. 2 and 3. In this figure the said parts are shown in their relative positions just after the weft-thread has been laid in and the warp-distributer is moving from front to rear and the warp-thread is passing over the weft-thread. Fig. 13 is a view of a warp-distributer, needle, needle-bar, and filling-thread guide, which, together with the threads, are shown in side elevation, and of the warp-distributer ring and cams, the needle-cylinder, and needle cam-cylinder, which are shown as seen in section on line $u$ $u$ of Figs. 2 and 3. In this figure the said parts are shown in their relative positions when the warp-distributer has reached the end of its inward oscillation. Fig. 14 is a view of the warp-distributer, needle, and needle-bar, which, together with the warp-thread, are shown in side elevation, and of the warp-distributer ring and cams, the needle-cylinder, and the needle cam-cylinder, which are shown as seen in section on line $v$ $v$ of Figs. 2 and 3, when the warp-distributer is moving in the direction indicated by the arrow in said Fig. 14. In this figure the weft-thread and the filling-thread are shown in section. Fig. 15 is a view of the warp-distributer, needle, needle-bar, and knitting-thread guide, which, together with the threads, are shown in side elevation, and of the warp-distributer ring and cams, the needle-cylinder, and the needle cam-cylinder, which are shown as seen in section on line *w w* of Figs. 2 and 3. In this figure the relative positions of the parts are seen at the time the warp-distributer has nearly reached the limit of its outward oscillation, but before the needle has descended to form and slip the stitch. In this figure the weft-thread and filling-thread are shown in section. Fig. 16 is a view of the cam-ring for the vibration of the warp-distributers, as seen on line *p p* of Fig. 17. Fig. 17 is a diagrammatic plan of the cam-ring in elevation for the vibration of the warp-distributers and for their vertical rise and fall. Fig. 18 is a plan view of the fabric made by my improved warp and weft knitting machine when the parts are set and adjusted, as illustrated in the several drawings. Fig. 19 is a sectional view of the same as seen on line *q q* of Fig. 18. Fig. 20 is a sectional view of the same as seen on line *o o* of Fig. 18. Figs. 21, 22, and 23 are side elevations of the several kinds of needle-bars used in said machine with the needles in position therein.

My invention relates to warp and weft knitting machines for the manufacture of a knitted cloth provided with warp and weft threads; and it consists of the novel construction and combination of the several parts, as hereinafter particularly described, and specifically set forth in the claims.

In the drawings, 1 represents the legs or standards of the machine, and 2 a ring constituting a part of the frame to which said legs or standards are fastened to support the same. The ring 2 has an inner annular flange of reduced thickness, which is channeled for the reception of ball-bearings 3 and is also provided with cloth-drawing cams 4. On the annular flange of the ring 2 is the horizontally-moving ring 5, also channeled and resting upon the balls 3, which are contained in the channels of the rings 2 and 5. This ring 5 supports the standards 6, which are bolted thereto at 7, and the hangers 8, which are bolted thereto at 9. A cloth-roll 10 is mounted rotatably between the hangers 8, and two draw-rolls 11 12 are mounted rotatably on the standards 6. Standards 13 14 are secured at their bottoms to the rings 2 and support at their tops a ring 15, fastened thereon. Posts 16 17 at proper intervals are bolted at the bottom to the ring 15 and support at the top the ring 18. The ring 18 has radial ribs 19, and at the center is a hub 20, having a central aperture. The ring 18 has perforations 21 22 for the passage of threads, and also thread-guides 23 24. A ring 25, parallel with the ring 18, is supported on brackets 26 from the latter and is furnished with thread-guides 27 28.

The parts 2, 13, 14, 15, 16, 17, 18, 25, and 26 constitute the frame of the machine and are supported by the legs 1.

The traveling ring 5 is rotated by gearing in the usual manner; but as this forms no part of my present invention it is not shown in the drawings; neither are shown the mechanism for operating the draw-rolls 11 12 nor the cloth-roll 10, these being common and well known in knitting-machines as heretofore constructed.

On the outer edge of the ring 2 are fastened bobbin-brackets 29 at proper intervals, which brackets are each provided with a central upright wire or stand whereon bobbins or spools 30 of filling-thread are mounted.

On the standard 13 is a bracket 31, having a boss 32 and a sleeve or tubular bearing 33. The standard 13 also has a tubular bearing 34. A shaft 35 is rotatably mounted in the bearings 33 34. A fly-wheel 36 is mounted and fixed on the shaft 35, and on said shaft is also loosely mounted a pulley 37, which is driven by a belt 38. A shipping-lever 39 is pivotally mounted on the boss 32 of the bracket 31, and its upper end is provided with a stud or pin 40, which extends into a circumferential groove of a sliding collar 41, which collar is movable on the shaft 35 by means of the lever 39. On the collar 41 are pivotally mounted the two arms 42 43 of a clutch, by which mechanism, as is well understood, the pulley 37 is made to revolve the shaft 35 or is loose thereon, according to the operation of the shipping-lever 39, as may be desired.

The inner end of the shaft 35 carries a beveled gear 44, which meshes with a beveled gear 45, the latter being fast upon a shaft 46, which is rotatably mounted in a tubular bearing 47 and passes through the ring 15. On the upper end of the shaft 46 is a gear 48. An idle or intermediate gear 49 is mounted on a stud 50, which passes through an extension of the ring 15. A shaft 51 is rotatably mounted at its bottom in said extension of the ring 15 and a bearing 52 thereof and at its top in a bearing 53 of the ring 18. The shaft 51 has a gear 54 fastened on it, which meshes with the gear 49. The shaft 51 has a gear 55 and at its top has a gear 56 fastened thereon. On a tabular portion of the ring 18 are the tubular bearings 57, 58, and 59. In the bearing 57 is mounted a shaft on which is an idle or intermediate gear 60, meshing with the gear 56. In the bearing 58 is mounted a shaft on which is an idle or intermediate gear 61, meshing with the gear 60. In the bearing 59 is mounted rotatably a shaft 62, having at its top a gear 63 meshing with the gear 61.

In the hub 20 of the ring 18 is fastened a rod 64 at its top, and at the bottom of said rod it carries the radial arms 65 66, which at their ends sustain a supporting-ring 67. The lower end of the shaft 62 is rotatably mounted in the supporting-ring 67, in which is provided a space for a gear 68, which is fastened on the lower end of the shaft 62.

A fixed needle cam-cylinder 69 is secured by bolts 70 at proper intervals to an annular flange 71 of the ring 15. Within this needle cam-cylinder 69 is the concentric needle-cylinder 72, having an outside annular flange 73, which is channeled and rests on ball-bearings 74, the latter being contained in a channel of a ring 75. The ring 75 is mounted in an annular groove or recess near the inner side of the ring 15 and is vertically adjustable in said groove or recess by means of adjusting-screws 76, which are held in the adjusted position by check-nuts 77. The outer edge of the annular flange 73 of the needle-cylinder 72 has gear-teeth meshing with the gear 48.

The posts 16 17 have brackets 78, and these support a fixed ring 79, which has an inner flange provided with a channel. A traveling ring 80 has a channel and rests on ball-bearings 81, which are contained in said channels. The ring 80 has on its outer edge gear-teeth meshing with the gear 55. The ring 80 is a warp-ring, as it carries on brackets 82 spools 83 of warp-threads. By means of hangers 84 85 it carries with it a warp guide-ring 86.

A weft guide-ring 87 is mounted by brackets 88 and by a sleeve 89 on the shaft 64 and is capable of adjustment thereon by means of the screw 90. The weft guide-ring 87 and the radial arm 65 66 have perforations 91 92, respectively, for the passage of the weft-threads through them, and the warp guide-ring 86 is perforated, as shown, for the passage of the warp-threads through it.

On bobbin-wires 93, which are screwed into the stationary ring 79 at regular intervals, are rotatably mounted spools 95, carrying weft-thread, and on a fixed ring 96, supported by brackets 97 upon the standards 16 17 on proper stands, are spools 98 of knitting-thread.

In Fig. 1 the fabric is shown at 99 passing down inside the needle-cylinder 72, then between the draw-rolls 11 12, and then upon the cloth-roll 10 in the manner usual in knitting-machines, the fabric being tubular when knit and seamless.

In the drawings the different threads are designated as follows: the warp-threads as $a$, the weft-threads as $b$, the knitting-thread as $c$, and the filling-thread as $d$.

While the knitting, warp, and weft and filling mechanism are shown in Fig. 1 on a reduced scale in order to illustrate their position and relation to the machine as a whole, it is more plainly represented on a larger scale in other figures of the drawings, to which therefore reference will now be made.

In Figs. 21, 22, and 23 are separately shown in side elevation, respectively, one of each of the three kinds of needle-bars and the needle therein, which needle-bars for convenience of description are designated A, B, and C. Each of these needle-bars has a needle 100 at the upper end thereof inserted and secured in position, and each has a lug 101 near the upper end. The needle-bar A has a pattern-lug 102 at a certain distance from the bottom thereof, the needle-bar B has a pattern-lug 103 a certain less distance from the bottom thereof, and the needle-bar C has a pattern-lug 104 a certain distance (less than the other two pattern-lugs) from the bottom thereof, all as illustrated in Figs. 21, 22, and 23. Each needle 100 has a latch 105 at its upper or hooked end.

On the outer surface of the needle-cylinder 72 are a number of vertical slots 106 in a series and also needle guide-plates 107, and between these guide-plates 107 and in each of said vertical slots is mounted a longitudinally-movable needle-bar A, B, or C. The cam-cylinder 69 on its inner surface has the camway 108, into which all the upper lugs 101 of the needle-bars A, B, and C project, as seen in Figs. 4, 5, 6, 7, 8, and 9. The upper and lower edges of this camway 108 are indicated by the dotted lines 109 109 110 110 in Figs. 4, 6, and 8, and the shape of said camway, as seen in cross-section on lines $x\ x$, $y\ y$, and $z\ z$ of Figs. 4, 6, and 8, respectively, is shown in Figs. 5, 7, and 9, respectively. From the line 111 downward to the bottom of the needle-cylinder 72 the exterior surface of the cam-cylinder is reduced in diameter, as indicated at 112 in Figs. 5, 7, and 9, providing there a peripheral space, into which the lower or pattern lugs of the needle-bars project, and in said space there project the pattern-cams $A^a$, $B^a$, and $C^a$, as shown in the last-named figures. Figs. 4 and 5 are designed especially to show the relative positions of the needles A (with their pattern-lugs 102) to the pattern-cams $A^a$, Figs. 6 and 7, to show the relative positions of the needles B (with their pattern-lugs 103) to the pattern-cams $B^a$, and Figs. 8 and 9 to show the relative positions of the needles C (with their pattern-lugs 104) to the pattern-cams $C^a$.

The needle-cylinder 72 has its upper end beveled inwardly, as shown in Fig. 10 (and other figures.) On the interior surface is the finished fabric 99, which is tubular as it leaves the needles and passes down to the cloth-roll 10, as seen in Fig. 1.

The supporting-ring 67 has an outwardly-extending horizontal flange 113, which is channeled, as shown in Fig. 10, and ball-bearings 114 are contained in the channel thereof.

A warp-distributer ring 115 is sustained by the flange 113 of the supporting-ring 67 and rests upon the ball-bearings 114, its under surface being channeled for that purpose. Its inner edge is provided with gear-teeth which mesh with the gear 68, as seen in Figs. 1, 12, and 15. Thus the warp-distributer ring travels around upon the supporting-ring 67. By this construction it is apparent from an examination of Fig. 1 that the rotation of the shaft 35 by the pulley and belt 37 38 causes the rotation of the warp-distributer ring 115 by means of the following-named gears: 44, 45, 48, 49, 54, 56, 60, 61, 63, and 68, the latter meshing with the gear-teeth of the warp-distributer ring 115, and also causes the rotation of the needle-cylinder 72 by means of the following-named gears: 44, 45, and 48, the latter meshing with the gear-teeth of the flange 73 of the needle-cylinder 72, and also causes the rotation of the ring 80 and the warp guide-ring 86, hanging therefrom, by means of the following-named gears: 44, 45, 48, 49, 54, and 55, the latter meshing with the gear-teeth on the edge of the ring 80. These gears are so placed and are of such size and are so timed that the warp-distributer ring 115, the needle-cylinder 72, and the warp-ring 80 (with its warp guide-ring 86) all rotate in the same direction and with the same speed.

A circular bead 116 extends around the warp-distributer ring 115 on the upper edge thereof. This bead has a rounded top and is slightly concaved on its outer and inner sides, as shown in Fig. 10. The warp-distributer ring 115 has equispaced radial slots 117 on its outer periphery, in which warp-distributers 118 have an oscillating movement, as illustrated, and are limited in such oscillation to a direct radial line of motion, and are thus prevented from lateral displacement.

As shown in Figs. 1 and 11, there is a ring 119 fastened to the supporting-ring 67 at the top thereof, the purpose of which is to support the warp-distributer camways. On the top of the ring 119 is a ring 120, having a flange 121. It is secured by screws 122 to the supporting-ring 119. Two cam-blocks 123 124 are placed and fastened by screws 125 beneath the rings 120. The camway 126 thus formed is shown in Figs. 16 and 17, where it is seen that it is serpentine in course, the block 123 being circular on its inner edge and curved on its outer edge and the block 124 being curved on its inner edge and circular on its outer edge, as shown in Figs. 16 and 17, thus leaving a parallel sinuous camway between them, (designated as 126.) A block 127 is fastened by screws 128 to the under surface of the ring 119 and projects outwardly therefrom, as shown in Fig. 11. A block 129 is secured by screws 130 to the outer edge of the supporting-ring 67. The upper block 127 is ring-shaped and has its lower edge formed with the bends shown in Fig. 17, and the lower block 129 is also ring-shaped and has its upper edge formed with the bends shown in Fig. 17, leaving between the blocks 127 and 129 a parallel bending camway 131.

The warp-distributers 118 are loosely mounted on the top of the bead 116 of the warp-distributer ring 115. There are as many of these warp-distributers 118 as there are needles 100—one for each needle. The warp-distributers 118 are most plainly seen in Figs. 10, 11, 12, 13, 14, and 15. Each warp-distributer 118 is integral throughout; but one portion of it constitutes what may be called a "head" and another portion an "arm," extending downwardly from one side of the head. On the lower side of the head is a slot 132, (best seen in Figs. 13 and 14,) which has a closed concave upper end. Said slot 132 receives the bead 116 of the warp-distributer ring 115. Each warp-distributer 118 has on its head two ears or projections 133 and 134. Near the lower end of the arm of the warp-distributer 118 are two thread-holes 135 136.

The ears 133 of all the warp-distributers 118 project into the camway 126, and the ears 134 of all the warp-distributers 118 project into the camway 131. The ears or projections 133 constitute what may be called the "oscillation-lugs" of the warp-distributers, and the ears or projections 134 constitute what may be called the "elevator-lugs" of the warp-distributers.

The warp-threads $a$ pass from the spools 83 through the apertures in the ring 86 to the warp-distributers 118.

The circular series of needles 100 is arranged in several sections or divisions, each section containing as many needles as may be desired for the purpose, and for each section there is a weft-guide 137, preferably fastened by screws 138 to the bottom of the supporting-ring 67 and the flange 113 thereof. This weft-guide is most plainly shown in Fig. 11, where it is seen to project out over the top of the needle 100 and to have its outer end bent downward. It is provided with three thread-holes 139 140 141, through which passes a weft-thread $b$ from a weft-spool 95, through the eyes 23 and perforations of the rings 18 87 and radial arms 65 66 to the weft-guide 137, as seen in Figs. 1 and 11. The weft-thread $b$, it is seen, passes through the thread-hole 139 to a position near above and just outside—that is, in front—of the hooked end of the needle 100.

For each section of needles 100 there is a knitting-thread guide 142, (see Fig. 15,) having its inner end bent downward and furnished with a thread-hole 143 and its outer end bent upward in a curve over and extending in front (outside) of the needle 100 and provided with two thread-holes 144 and 145. The knitting-thread $c$ passes from the knitting-thread spools 98 through the eyes 27 28 and perforations in the rings 18 87 and radial arms 65 66 to the knitting-thread guide 142.

For every section of needles 100 there is a filling-thread guide 146, as shown in Figs. 3 and 13, fastened by screws 147 to the outer side of the needle cam-cylinder 69. Its upper end is bent over in a curve above and extending over the hook end of the needle 100 to the inside of said needle—that is, behind the same—where it terminates in a horizontally-extending end. The filling-thread guide 146 has three thread-holes 148, 149, and 150. The filling-threads $d$ pass from the filling-thread spools 30 through eyes 151 and thread-holes 148 149 150 to a position behind the needles 100.

In the space 112 between the needle-cylinder 72 and the needle cam-cylinder 69 are the pattern-cams $A^a$, $B^a$, and $C^a$, as already specified, one for each section or division of needles fixed in position, either permanently or detachably, (in the latter construction being supported by screws or otherwise, as may be necessary.) These pattern-cams are as numerous and are located in whatever position may be required by the pattern designed for the fabric.

Having thus described the parts of my invention, I will now explain the operation.

It is to be understood that the needle-cylinder 72 is revolving in the usual manner within the needle cam-cylinder 69 in the direction of the arrows marked $m$ in Figs. 3, 4, 6, and 8. The knitting-needles 100 and their respective needle-bars rise and descend, as heretofore well known, as the lugs 101 of said needle-bars travel along in the camway 108 (which lies between the dotted lines 109 110 of Figs. 4, 6, and 8) of the needle cam-cylinder 69. The knitting-threads $c$ pass, as usual, through the two thread-holes 144 145 of the knitting-thread guide 142 and are looped and drawn by the latched needles 100 in the manner common in knitting-machines.

By my improved devices I propose to control the laying in of the warp and weft threads $a$ and $b$ in relation to each other and to the knitting-threads $c$, both as to the proper combination of them into the knitted fabric and also as to forming patterns or figures in the fabric by the variation in the laying in of the warp and weft threads. The warp-thread may be laid upon either the front or the back of all the needles or upon the front of some of the needles and upon the back of the others of the needles, according to the different varieties of patterns.

In Figs. 18, 19, and 20 I show the style or pattern of the cloth made by my hereinbefore-described machine, the same being a diagonal pattern. This is the pattern of cloth made by said machine when the position of the needles and pattern-cams are as illustrated in Figs. 1 to 9, inclusive, of the drawings. Other styles or patterns of cloth can be made by my said machine when the pattern-cams and needle-bars are differently adjusted and selected.

The warp-distributers 118 are all mounted upon the circular bead 116 of the warp-distributer ring 115 and have both a longitudinally-oscillating movement in their own planes, respectively, in radial directions and a reciprocating vertical movement, as illustrated in Figs. 10 to 15, inclusive. In Fig. 10 is shown the position of the warp-distributer 118 at the limit of its outward oscillation just as the knitting-stitch is about to be made.

In Fig. 15 it is seen that the ears 133 134 of the warp-distributer 118 are in their respective camways 126 and 131 in such a manner that the warp-distributer rests upon the top of the bead 116, whose convex upper surface is in contact with the concave end of the slot 132 of said warp-distributer. In the position of the parts shown in Fig. 15 the warp-distributer 118 lies in front of the needle 100, but in a radial plane between the needle 100 there shown and the next adjacent needle, as best seen in Figs. 2 and 3. As the warp-distributer ring 115 rotates by means of the gearing 44, 45, 48, 49, 54, 56, 60, 61, 63, and 68 upon the flange 113 of the supporting-ring 67 the ears 133 of the warp-distributers 118 follow in the sinuous curves of the camway 126, which is formed between the blocks 123 and 124, (best seen in Fig. 16,) and thus the warp-distributers 118 are vibrated in and out in succession by these oscillation-ears 133. If, however, the warp-distributer 118 rested on the top of the bead 116, as on a pivot for a fulcrum, and the lower end of the warp-distributer 118 therefore described in its oscillation a true arc of a circle in a downward curve, said lower end would swing against the upper end of the needle-cylinder 72 and could oscillate no farther. In order that the lower end of the warp-distributer may rise and clear the top of the needle-cylinder and move in the direction indicated by the dotted line, (marked $n$ in Figs. 13, 14, and 15,) the warp-distributers 118 are also provided with elevator-ears 134, which follow in the angularly-directed camway 131, which is formed between the rings 127 and 129, (best seen in Fig. 17,) and thus each of the warp-distributers 118 has an alternate upward and downward movement as it travels along the rotation of the warp-distributing ring 115. In this manner as soon as the warp-distributer 118 begins its inward oscillation the lower end of said distributer begins to rise and describe an upwardly-directed curve, (marked $n$ in Fig. 15.) At the middle of its inward oscillation the warp-distributer is in the position illustrated in Fig. 14, where it has cleared the upper end of the needle-cylinder 72. The warp-distributer 118 then completes its inward oscillation and comes to the position illustrated in Fig. 13 to the rear of the needle 100. As shown in Figs. 14 and 15, it is seen that the warp-distributers 118 are unseated from the bead 116, and this rise and descent of the warp-distributers 118 are caused by the travel of its ear or projection 134 in the camway 131. After reaching the limit of its inward oscillation, as just described, the warp-distributer 118 begins its outward oscillation.

By an examination of Figs. 2 and 3 it can be plainly seen that all the warp-distributers 118 in their travel in the direction of the arrow $m$ pass in front of the weft-guide 137 and then vibrate inwardly to the rear of the filling-thread guide 146 and then vibrate outwardly in front of the knitting-thread guide 142.

As seen in Figs. 4, 6, and 8, the needle-bars whose lower (pattern) lugs have ridden up the pattern-cams, respectively, in passing off from said pattern-cams continue to maintain their elevated position, being held in such position because of the weft-threads which then lie upon the front and which thus cause sufficient friction to prevent the descent of the needles. The needles, however, are forced down again to their former position by the descending portion of the upper camway when they reach that position, respectively.

I will now proceed to describe the whole operation between the knitting of one stitch, the laying in of all the threads, and the knitting of the next stitch, Fig. 11. Here the needle-bar A has been raised to its first position by its pattern-lug 102 coming in contact with the pattern-cam $A^a$. Its latch extends downwardly. The warp-distributer is extended to its extreme outward position. The weft-guide is laying weft-thread in front of the needle of the needle-bar A, as shown on line $s\ s$ in Figs. 2 and 3. By a forward movement of the needle-cylinder 72 the next position is that shown in Fig. 12. Here is shown the second position of the weft-thread $b$, which has just been laid in front of the needle and is seen in section upon the top of the previously-formed knitting-loop $c$ with the warp-thread $a$ in the act of folding over the weft-thread $b$, as shown in Figs. 2 and 3 on line $t\ t$. A further movement of the needle-cylinder 72 brings the parts into the position shown in Fig. 13. Here the warp-distributer has passed to the limit of its inward oscillation and by the tension of the warp-thread $a$ has bent back the weft-thread $b$ (extending between the adjacent needles of the needle-bars A A) and carries said weft-thread $b$ to the rear of the needles of the needle-bars B and C. (In this figure the needle is that on the needle-bar C.) The needles on the needle-bars A still continue in their first position; but the needles of the needle-bars B and C now rise to the same level with the needles of the needle-bars A, as seen on line $u\ u$ in Figs. 2 and 3, by means of the lugs 101, which are common on all the needle-bars, rising on main lifting-cam. By continued forward movement of the needle-cylinder 72 the parts come to the position shown in Fig. 14. Here the warp-distributer is seen in its central position in passing from the rear to the front. The warp-thread $a$ is in the act of folding over the filling-thread $d$, which, together with the weft-thread $b$, is shown in section. In this figure the parts are in the position seen on line $y\ y$ of Figs. 2 and 3. The next position is illustrated in Fig. 15. At this point the needles of all the needle-bars A A, B B, and C C have risen to the same level. The needle-latches are above the weft-thread $b$. The warp-distributers are near the limit of the outward oscillation. The warp-thread $a$ is over the weft-thread $b$ and over the filling-thread $d$. The knitting-thread $c$ is in position to be hooked by the needle and to form a new loop for the next stitch. By continued forward movement of the needle-cylinder 72 the parts are brought into the position shown in Fig. 10. Here the lugs 101 of all the needle-bars are pressed down by the upper cam, (in the well-known manner.) The latch of the needle as the needle descends is raised by the weft-thread $b$, which was below said latch, and the loop of knitting-thread $c$ on the needle incloses the knit thread between the latch and the hook of the needle. The continuing downward movement of the needle then throws the loop and weft thread over the hook and inclosed knitting-thread and slips the stitch which has been made into the fabric, the hook in the meanwhile catching the knitting-thread to start the next stitch. This completion of the operation is shown in Fig. 10 and is seen on line $r\ r$ of Figs. 2 and 3. A similar movement goes on in the next section or division of needles with the needles of the needle-bars B and then in the next section with the needles of the needle-bars C. In the pattern illustrated in the drawings and hereinbefore particularly described the knitting (or slipping of the stitches) takes place only when the warp-distributers are in their extreme forward position.

In the common kind of cloth made by machines of this class as heretofore constructed there is no weft-thread, but simply warp-threads and knitting-threads with a filling-thread laid between the needles and warp-threads, as shown in Fig. 13. That kind of cloth is plain and cannot be made with any kind of figure or patterns except such as are produced by skipping stitches—that is, by having certain ones of the needles go out of action, (or, in other words, remain idle,) so that the filling-threads are always on the inner side of the warp-threads.

In my machine hereinbefore described none of the needles remain idle or go out of action. The weft-thread is laid in front of certain raised needles as the pattern may require. Therefore the cloth which I produce by this mechanism is firm, close, and strong.

It is obvious that instead of having the needle-cylinder rotatable and the needle cam-cylinder stationary, as above described, the needle-cylinder may be stationary and the needle cam-cylinder may be rotatable; but such reversal would be within the scope of my invention and involve the same mechanical principle.

I claim as a novel and useful invention and desire to secure by Letters Patent—

1. In a warp and weft knitting machine, the combination of knitting mechanism comprising a rotatable needle-cylinder and reciprocating needles thereon adapted to loop and draw knitting-threads, and means of imparting to said needles the requisite knitting movements, the fixed weft-guides adapted to lay in the weft-threads, downwardly-extending warp-distributers traveling in the same direction and with the same speed as said needle-cylinder and capable of an oscillating movement between the needles to carry warp-threads into such a position as to bend back the weft-threads, and means adapted to impart said oscillating movement to the warp-distributers, substantially as shown and for the purpose specified.

2. In a machine of the class described, the combination of weft-laying devices, knitting mechanism comprising a rotatable needle-cylinder and vertically-movable reciprocating needles mounted thereon and adapted to loop and draw knitting-threads, means of imparting to said needles the requisite knitting movements, downwardly-extending warp-distributers mounted and traveling in the same direction and with the same speed as said needle-cylinder and arranged to carry warp-threads, means of imparting an oscillating movement to the warp-distributers between the needles, respectively, and means adapted to lift the warp-distributers over the top edge of the needle-cylinder at the middle of their inward and outward oscillation, substantially as set forth.

3. In a machine of the class described, the combination of knitting mechanism comprising a rotatable needle-cylinder and reciprocating needles thereon adapted to loop and draw knitting-threads, and means of imparting to said needles the requisite knitting movements, the fixed weft-guides adapted to lay in the weft-threads in front of the needles, downwardly-extending warp-distributers traveling with said needle-cylinder and capable of an oscillating movement between the needles to carry warp-threads into such a position as to bend back the weft-threads, and means adapted to impart said oscillating movement to the warp-distributers, substanially as specified.

4. In a machine of the class described, the combination of a rotatable needle-cylinder, a fixed needle cam-cylinder concentric with the needle-cylinder and surrounding the same, which needle cam-cylinder has annular zigzag cam-grooves on its inner surface, needle-bars movably mounted in vertical grooves upon the exterior of the needle-cylinder and each having a lug extending from the edge thereof into said camway, a needle secured in each needle-bar and provided with a hooked end and a pivoted latch, fixed weft-guides adapted to direct weft-threads on the top of the needle-cylinder on the front of all the needles, a knitting-thread guide, a rotatable ring mounted above the needle-cylinder concentric therewith and movable with it in the same direction and with the same speed, a series of warp-distributers mounted upon said ring, each of which consists of a downwardly-extending arm having a thread-hole near its lower end for the passage of a warp-thread and also of an integral head having a slot by which it fits upon said ring and also having an ear or lug or projection on its top and an ear or lug or projection on its side, a fixed cam-ring properly supported and having a horizontally-extending annular zigzag camway into which the top ear or lug of each warp-distributer extends, and a fixed cam-ring having a zigzag annular camway into which the side ear of each warp-distributer extends, all operating substantially as and for the purpose specified.

5. In a machine of the class described, the combination of a rotatable needle-cylinder, a fixed needle cam-cylinder concentric with the needle-cylinder and surrounding the same, which needle cam-cylinder has an annular zigzag camway for needle movement and a broad annular camway for needle pattern movement, needle-bars movably mounted in vertical grooves upon the exterior of the needle-cylinder, an upper lug on each needle-bar extending into the first-named camway, lower pattern-lugs on all said needle-bars at suitable locations thereon and extending into the second-named camway a fixed pattern-cam mounted in the second-named camway and having a beveled edge with which said pattern-lugs of the needle-bars are adapted to coöperate, a needle secured in each needle-bar and provided with a hooked end and a pivoted latch, weft-guides adapted to direct weft-threads on the top of the needle-cylinder on the front of each needle, a knitting-thread guide, a rotatable ring mounted above the needle-cylinder concentric therewith and movable in unison with it, a series of warp-distributers mounted upon said ring each of which consists of a downwardly-extending arm having a thread-hole near its lower end for the passage of a warp-thread and also having an integral head provided with a slot by which it fits upon said ring and also provided with a cam or projection on its top and a cam or projection on its side, a fixed cam-ring properly supported and having a horizontally-extending annular zigzag camway into which the top ear of each warp-distributer extends, and a fixed cam-ring having a zigzag annular camway into which the side ear of each warp-distributer extends, substantially as specified.

6. In a machine of the class described, the combination of a rotatable needle-cylinder, a fixed needle cam-cylinder concentric with the needle-cylinder and surrounding the same, which needle cam-cylinder has an annular zigzag camway for needle movement and a broad annular camway for needle pattern movement, needle-bars movably mounted in vertical grooves upon the exterior of the needle-cylinder, an upper lug on each needle-bar extending into the first-named camway, lower pattern-lugs on all said needle-bars some at a certain distance from the bottom and some at a certain other distance from the bottom, fixed pattern-cams mounted in the second-named camway some at a height to engage with the first-named class of pattern-lugs and some at a height to engage with the second-named class of pattern-lugs, a needle secured in each needle-bar and provided with a hooked end and a pivoted latch, weft-guides adapted to direct weft-threads on the top of the needle-cylinder on the front of each needle, a knitting-thread guide, a rotatable ring mounted above the needle-cylinder concentric therewith and movable in unison with it, a series of warp-distributers mounted upon said ring each of which consists of a downwardly-extending arm having a thread-hole near its lower end for the passage of a warp-thread and also having an integral head provided with a slot by which it fits upon said ring and also provided with an ear or projection on its top and an ear or projection on its side, a fixed cam-ring properly supported and having a horizontally-extending annular zigzag camway into which the top ear of each warp-distributer extends, and a fixed camway having a zigzag annular camway into which the side ear of each warp-distributer extends, substantially as described.

7. In a machine of the class described, the combination of a rotatable needle-cylinder, needle-bars mounted and vertically movable in grooves on the exterior of said needle-cylinder, knitting-needles secured to said needle-bars, respectively, a fixed needle cam-cylinder concentric with the needle-cylinder upon the outside thereof and having an upper annular camway for needle movement and a broad annular camway for needle pattern movement, an upper lug on each needle-bar extending into the first-named camway, lower pattern-lugs on all said needle-bars at suitable locations thereon and extending into the second-named camway each of which has a beveled edge and is adapted to engage such pattern-lugs of the needle-bars as are in the horizontal planes of said fixed cams, respectively, a needle secured in each needle-bar and having a hooked end and a pivoted latch, weft-guides adapted to direct weft-threads upon the top of the needle-cylinder on the front of each needle, downwardly-extending warp-distributers carrying warp-threads and adapted to combine said warp-threads into the fabric and which are capable of an oscillating movement with respect to said needles and of rising and clearing the top of the needle-cylinder at the middle of each inward and outward oscillation, and means adapted to impart said movements to the warp-distributers, substantially as described.

In testimony whereof I affix my signature in presence of two witnesses.

GEORGE T. NICHOLLS.

Witnesses:
EDWARD F. LOVEJOY,
WARREN R. PERCE.